US012739683B2

(12) United States Patent
Cha et al.

(10) Patent No.: US 12,739,683 B2
(45) Date of Patent: Sep. 15, 2026

(54) METHOD AND REPORTING OF THE CARRIER PHASE MEASUREMENT REPORTING

(71) Applicant: Nokia Technologies Oy, Espoo (FI)

(72) Inventors: Hyun-Su Cha, Chicago, IL (US); Gilsoo Lee, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 296 days.

(21) Appl. No.: 18/437,505

(22) Filed: Feb. 9, 2024

(65) Prior Publication Data

US 2025/0261015 A1 Aug. 14, 2025

(51) Int. Cl.
*H04W 24/10* (2009.01)
*H04L 5/00* (2006.01)
*H04L 27/00* (2006.01)

(52) U.S. Cl.
CPC .......... *H04W 24/10* (2013.01); *H04L 5/0048* (2013.01); *H04L 27/0014* (2013.01)

(58) Field of Classification Search
CPC .... H04W 24/10; H04W 64/00; H04L 5/0048; H04L 27/0014; H04L 5/0051
See application file for complete search history.

(56) References Cited

U.S. PATENT DOCUMENTS 12,339,381 B2 * 6/2025 Cha .................... G01S 5/009
12,513,657 B2 * 12/2025 Bao .................... H04L 5/0048
2024/0048309 A1 * 2/2024 Farag .................... H04L 5/0051
2024/0381141 A1 * 11/2024 Bao .................... H04W 24/10
2024/0381299 A1 * 11/2024 Bao .................... H04L 5/0048
2025/0254646 A1 * 8/2025 Wang .................... G01S 5/02
2025/0350988 A1 * 11/2025 Peng .................... G01S 5/0036
2025/0386318 A1 * 12/2025 Ur Rehman ....... H04B 7/06952
2026/0046833 A1 * 2/2026 Bao .................... H04L 5/0048
2026/0067052 A1 * 3/2026 Manolakos .............. G01S 5/10

OTHER PUBLICATIONS

3GPP "LTE; 5G; LTE Positioning Protocol (LPP)" ETSI TS 37.355 Version 16.3.0 Release 16 (Jan. 2021).
3GPP "5G; NR; Physical Layer Procedures for Data" ETSI TS 38.214 Version 16.2.0 Release 16 (Jul. 2020).
3GPP "5G; NR; Radio Resource Control (RRC); Protocol Specification" ETSI TS 38.331 Version 15.3.0 Release 15 (Oct. 2018).
Intel Corporation, CATT, Ericsson "New WID on Expanded and Improved NR Positioning" 3GPP TSG RAN Meeting #98-e RP223549 (Dec. 12-16, 2022).

* cited by examiner

*Primary Examiner* — Brian T O'Connor
(74) *Attorney, Agent, or Firm* — Carter, DeLuca & Farrell LLP

(57) ABSTRACT

An apparatus includes at least one processor and at least one memory storing instructions. The instructions, when executed by the processor, cause the apparatus to: receive a request to report a carrier phase measurement for a first detected arrival signal path of a reference signal; detect multiple arrival signal paths from the reference signal including the first detected arrival signal path; determine line of sight indicator values for the detected multiple arrival signal paths including the first detected arrival signal path; and transmit a report-comprising that includes at least one carrier phase measurement for at least one arrival signal path of the multiple arrival signal paths.

1 Claim, 7 Drawing Sheets

METHOD AND REPORTING OF THE CARRIER PHASE MEASUREMENT REPORTING

TECHNICAL FIELD

The examples and non-limiting example embodiments relate generally to communications and, more particularly, to a method and reporting of the carrier phase measurement reporting. Some example embodiments may generally relate to mobile or wireless telecommunication systems, such as 3rd Generation Partnership Project (3GPP) Long Term Evolution (LTE), 5th generation (5G) radio access technology (RAT), new radio (NR) access technology, 6th generation (6G), and/or other communications systems. For example, certain example embodiments may relate to systems and/or methods for providing carrier phase positioning.

BACKGROUND

It is known for a communication device to gain access to a communication network via an access network node.

SUMMARY

In accordance with an aspect, an apparatus includes at least one processor; and at least one non-transitory memory storing instructions that, when executed by the at least one processor, cause the apparatus at least to: receive a request to report a carrier phase measurement for a first detected arrival signal path of a reference signal; detect multiple arrival signal paths from the reference signal including the first detected arrival signal path; determine line of sight indicator values for the detected multiple arrival signal paths including the first detected arrival signal path; and transmit, based on the determined line of sight indicator value for the first detected arrival signal path not being greater than at least one other line of sight indicator value for at least one other detected arrival signal path of the multiple arrival signal paths, a report comprising at least one carrier phase measurement for at least one arrival signal path of the multiple arrival signal paths.

In accordance with an aspect, an apparatus includes at least one processor; and at least one non-transitory memory storing instructions that, when executed by the at least one processor, cause the apparatus at least to: transmit a request to report a carrier phase measurement for a first detected arrival signal path of a reference signal; receive, based on a line of sight indicator value for the first detected arrival signal path not being greater than at least one other line of sight indicator value for at least one other arrival signal path of multiple arrival signal paths of the reference signal, a report comprising at least one carrier phase measurement for at least one arrival signal path of the multiple arrival signal paths; and estimate a location of a user equipment, based on the at least one carrier phase measurement for the least one arrival signal path of the multiple arrival signal paths.

In accordance with an aspect, an apparatus includes at least one processor; and at least one non-transitory memory storing instructions that, when executed by the at least one processor, cause the apparatus at least to: receive a request to report a carrier phase measurement for a first detected arrival signal path of a reference signal; detect multiple arrival signal paths from the reference signal including the first detected arrival signal path; determine a line of sight indicator value for the detected multiple arrival signal paths including the first detected arrival signal path; and transmit, based on the determined line of sight indicator value for the first detected arrival signal path not being greater than at least one of the line of sight indicator values for the other arrival signal paths, a report comprising one of: a carrier phase measurement for the first detected arrival signal path, when the line of sight indicator value for the first detected arrival signal path is greater than a threshold value, or a carrier phase measurement for one arrival signal path of the detected multiple arrival signal paths, wherein the one arrival signal path has the largest line of sight indicator value among the determined line of sight indicator values for the multiple arrival signal paths, or an average carrier phase measurement for at least one arrival signal path of the multiple arrival signal paths.

BRIEF DESCRIPTION OF THE DRAWINGS

The foregoing aspects and other features are explained in the following description, taken in connection with the accompanying drawings.

DETAILED DESCRIPTION OF EXAMPLE EMBODIMENTS

Figure 1:
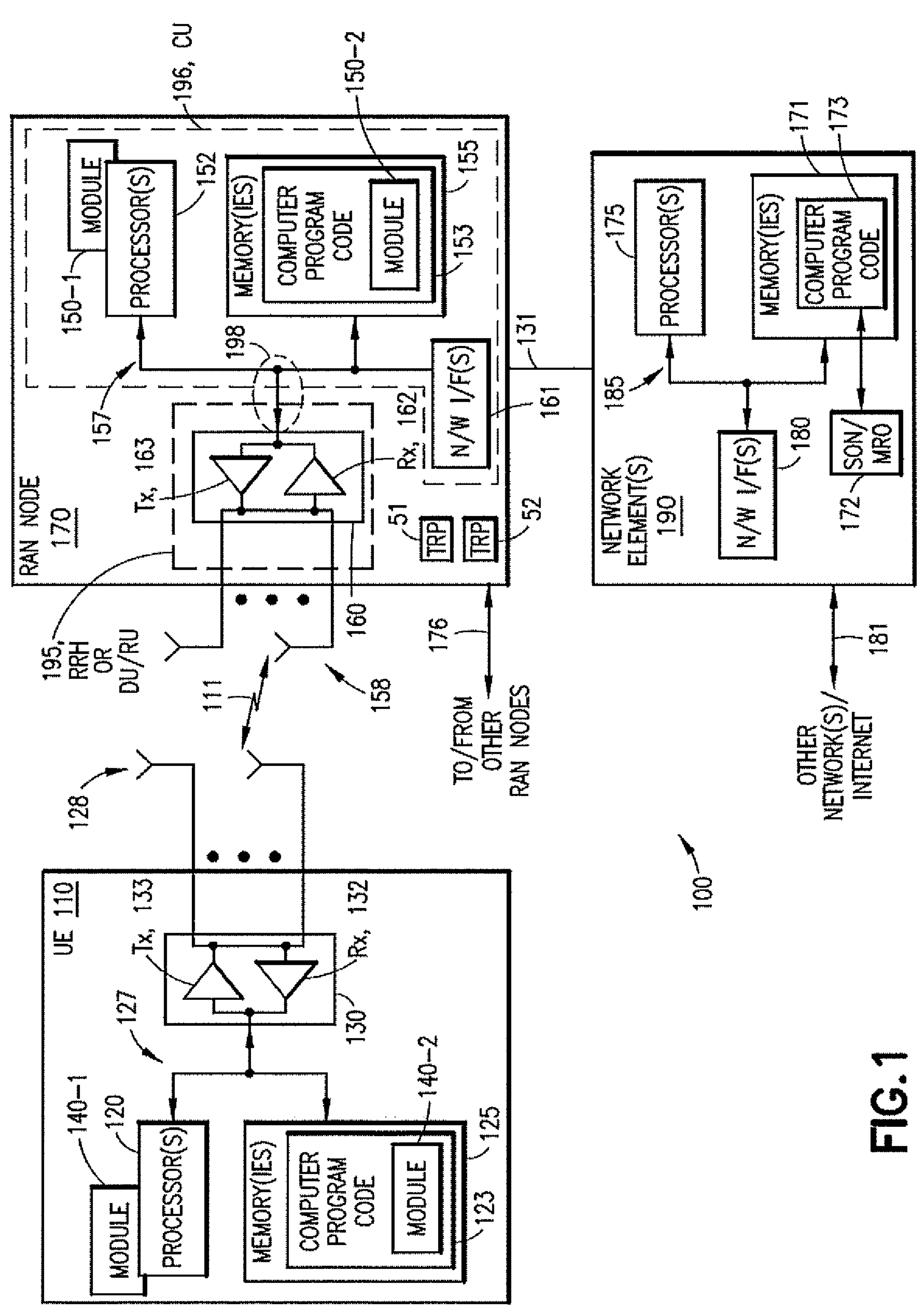
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module

140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access for wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, one or more memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

A RAN node/gNB can comprise one or more TRPs to which the methods described herein may be applied. FIG. 1 shows that the RAN node 170 comprises TRP 51 and TRP 52, in addition to the TRP represented by transceiver 160. Similar to transceiver 160, TRP 51 and TRP 52 may each include a transmitter and a receiver. The RAN node 170 may host or comprise other TRPs not shown in FIG. 1.

A relay node in NR is called an integrated access and backhaul node. A mobile termination part of the IAB node facilitates the backhaul (parent link) connection. In other words, the mobile termination part comprises the functionality which carries UE functionalities. The distributed unit part of the IAB node facilitates the so called access link (child link) connections (i.e. for access link UEs, and backhaul for other IAB nodes, in the case of multi-hop IAB). In other words, the distributed unit part is responsible for certain base station functionalities. The IAB scenario may follow the so called split architecture, where the central unit hosts the higher layer protocols to the UE and terminates the control plane and user plane interfaces to the 5G core network.

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (mobility management entity)/SGW (serving gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. Computer program code 173 may include SON and/or MRO functionality 172.

The wireless network 100 may implement network virtualization, which is the process of combining hardware and software network resources and network functionality into a single, software-based administrative entity, or a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback devices having wireless communication capabilities, internet appliances including those permitting wireless internet access and browsing, tablets with wireless communication capabilities, head mounted displays such as those that implement virtual/augmented/mixed reality, as well as portable units or terminals that incorporate combinations of such functions. The UE 110 can also be a vehicle such as a car, or a UE mounted in a vehicle, a UAV such as e.g. a drone, or a UE mounted in a UAV. The user equipment 110 may be terminal device, such as mobile phone, mobile device, sensor device etc., the terminal device being a device used by the user or not used by the user.

UE 110, RAN node 170, and/or network element(s) 190, (and associated memories, computer program code and modules) may be configured to implement (e.g. in part) the methods described herein. Thus, computer program code 123, module 140-1, module 140-2, and other elements/features shown in FIG. 1 of UE 110 may implement user equipment related aspects of the examples described herein. Similarly, computer program code 153, module 150-1, module 150-2, and other elements/features shown in FIG. 1 of RAN node 170 may implement gNB/TRP related aspects of the examples described herein. Computer program code 173 and other elements/features shown in FIG. 1 of network element(s) 190 may be configured to implement network element related aspects of the examples described herein.

Having thus introduced a suitable but non-limiting technical context for the practice of the example embodiments, the example embodiments are now described with greater specificity.

A Rel-18 work item [RP-223549, "New WID on Expanded and Improved NR Positioning"] was agreed for further enhancement of NR positioning. One of the main topics is to support carrier phase (CP) positioning on top of the currently supported positioning technique.

The work item included work to: specify physical layer measurements and signaling to support NR DL and UL carrier phase positioning for UE-based, UE-assisted, and NG-RAN node assisted positioning. Existing DL PRS and UL SRS for positioning are used for NR carrier phase measurements, specify measurements that are limited to a single carrier and/or DL PRS positioning frequency layer (PFL), specify corresponding new core requirements, as well as identifying and specifying the impact on the existing specification, including RRM measurements without measurement gaps in connected and inactive mode (including PRS measurement period/reporting) and procedures.

Provided next is brief background information on measurements and a procedure for a carrier phase (CP) positioning method assuming UL (uplink)-based CP. Fundamentally, in the carrier phase positioning technique, the target UE transmits uplink reference signals, and multiple TRPs (Transmission and Reception Point) measure phase measurements, which are used to estimate the location of target UEs. For the transmitted SRS resource from the k-th UE, the phase measurement at the i-th TRP can be denoted by $$\varphi_{ik} = d_{ik} + c(\delta_k - \delta_i) + \lambda N_{ik} \tag{1}$$

In Equation (1), $\varphi_{ik} = \frac{1}{2\pi}\hat{\varphi}_{ik}$ denotes the phase measurement in cycles and to leave out repeated use of $2\pi$, and $d_{ik}$, c, $\delta_k$, $\delta_i$, and $N_{ik}$ represent respectively actual geographical distance between the k-th UE and the i-th TRP, speed of light, internal clock bias at the k-th UE, internal clock bias at the i-th TRP, and integer ambiguity of the propagated wavelength. Similar to (1), the same equation is derived for the j-th TRP such that $\varphi_{jk}=d_{jk}+$ $c(\delta_k-\delta_j)+\lambda N_{jk}$, and the single difference measurement between two TRPs is described as the following equation.

$$\Delta\varphi_{ij}^{k} = \Delta d_k + c\Delta\delta_{ij} + \Delta N_{ij}^{k}\lambda \quad (2)$$

In Equation (2), $\Delta\varphi_{ij}^{k} = \varphi_{ik} - \varphi_{jk}$, $\Delta d_k = d_{ik} - d_{jk}$, $\Delta\delta_{ij} = \delta_i - \delta_j$, and $\Delta N_{ij}^{k} = N_i - N_j$.

From this single differential operation, the UE clock bias is cancelled, which is similar to RTOA (Relative Time of Arrival) measurement of UL-TDOA. The clock error between TRPs is remaining but it is cancelled by double differential operation using measurements from reference device.

Let us assume that the K-th UE is a positioning reference Unit (PRU). For the transmitted SRS from the PRU, the single difference measurement between the i-th TRP and j-th TRP is $$\Delta\varphi_{ij}^{K} = \Delta d_K \times \frac{1}{\lambda} + f\Delta\delta_{ij} + \Delta N_{ij}^{K}. \quad (3)$$

$$\Delta\Delta\varphi_{ij}^{kK} = \Delta\Delta d_{kK} + \Delta\Delta N_{ij}^{kK}\lambda$$

In Equation (3), $\Delta\Delta\varphi_{ij}^{kK} = \Delta\varphi_{ij}^{k} - \Delta\varphi_{ij}^{K}$, $\Delta\Delta d_{kK} = \Delta d_k - \Delta d_K$, and $\Delta\Delta N_{ij}^{kK} = \Delta N_{ij}^{k} - \Delta N_{ij}^{K}$.

In the end, the clock error between TRPs is cancelled out. We considered clock bias at the UE and the TRP, which are the main errors to explain single difference and double difference method of carrier phase method.

A LoS (Line of Sight)/NLoS (Non-Line of Sight) indicator was introduced in the specification TS 37.355.

Described herein is the way to report carrier phase measurement for the first arrival path of received reference signals. the following progress was achieved.

| Agreement |
| --- |
| Only the carrier phase measurements (i.e., DL/UL RSCP, DL RSCPD) of the first path are supported in Rel-18. |

The current agreement only allows the UE to report RSCP (Reference Signal Carrier Phase) or RSCPD (Reference Signal Carrier Phase Difference) measurement only for the arrival 1$^{st}$ path. It should be noted that the legacy RSTD or UE Rx-Tx time difference measurement can be reported also for additional paths. In addition, when the UE reports CP measurements, it should include timing measurements. The LoS/NLoS indicator field is shared between the timing measurement and CP measurement, as the detection capability of the path is not tied with the positioning techniques.

Issue: the following example case is feasible, as the first path could be a peak from interference or noise. The UE can report a timing measurement for the 1$^{st}$ detected path with an LoS indicator value of 0.4. The UE can report a timing measurement for the 2$^{nd}$ detected path with an LoS indicator value of 0.6.

Based on the current agreement, the UE is not able to report CP measurement for the 2nd detected path, but the first detected path may not be the actual 1$^{st}$ path as the LoS indicator value is not greater than the 2$^{nd}$ detected path. Based on the current specification, there is ambiguity of UE behavior. The examples described herein address this issue.

Described herein is UE behavior to address the ambiguous UE behavior on the RSCP or RSCPD measurement reporting.

A first arrival path is the first detected path from the device, but the UE cannot guarantee if it is a real/actual first arrival path as it could be noise/interference signal. Also, the signal strength of the first path could be very weak if there is a strong blockage between the UE and the TRP. For example, the UE can detect three arrival paths like path1 (t1), path2 (t2), path3 (t3), for times t1, t2, and t3, where t1 is less than t2, and t2 is less than t3, then the detected first path is path1 (t1). However, if for example the LoS/NLoS factors are 0.1 for path1, 0.1 for path2, and 0.8 for path 3, the path3 (t3) would be likely to be the actual first arrival path. Thus, "detected arrival path" and "actual/true arrival path" are not the same.

DL-Based CP Positioning

The LMF provides the UE with assistance data including PRS configuration information.

For DL (Downlink)-based CP positioning, the LMF initiates CP technique. The LMF requests UE to report CP measurements for the specific TRPs.

The UE detects multiple arrival signal paths from a specific PRS transmitted from a TRP. For a specific DL PRS resource, the UE detects a high LoS indication value other than the 1$^{st}$ detected path. For example, the UE determines that the LoS indication value of the 2$^{nd}$ detected path is greater than that of the 1$^{st}$ detected path.

Option 1) The UE reports a RSCP or RSCPD measurement for the 1$^{st}$ detected path even though LoS probability is lower than the LoS probability of the additional paths such as 2$^{nd}$ detected path, but it also informs to the LMF that the 1$^{st}$ path LoS indicator is not greater than that of additional paths.

The following example is provided for a better understanding of Option 1. Reporting contents #1: (LoS indicator=0.4, RSTD measurement, RSCPD measurement). Reporting contents #2: (LoS indicator=0.6, RSTD measurement). In addition, the UE reports the reported measurements associated with LoS indicator of 0.4 is corresponding to the "first path".

Option 2) The UE reports or is indicated by the LMF to report a RSCP or RSCPD measurement for a signal path showing the largest LoS indication value. In this option, even if the UE does not report the LoS indicator (as it is optional parameter), the LMF assumes the set of reporting contents containing RSCP or RSCPD is associated with the largest LoS path.

Option 2-1) The UE can additionally provide which signal path (N-th detected path) was selected to obtain a CP measurement.

Option 2-2) The UE does not additionally provide any information. The LMF will consider the reported CP measurement for the first detected path, even though the CP measurement was not made from the first detected path.

For example, for option 2-2, the LMF may determine that the carrier phase measurement for the arrival signal path having the largest line of sight indicator value is for the arrival signal path having a line of sight indicator value that is not greater than at least one line of sight indicator for another arrival signal path, in response to the report having the carrier phase difference measurement not comprising the arrival signal path having the largest line of sight indicator value, and the report comprising the carrier phase measurement for the arrival signal path having the largest line of sight indicator value, when the report does not comprise the arrival signal path having the largest line of sight indicator value, and the report comprises the carrier phase measurement for the arrival signal path having the largest line of sight indicator value.

Option 3) The UE reports an average of RSCP or RSCPD measurements for the first N detected paths (for a number N). In this case, the UE acknowledge that anyone of the first N detected paths could be an actual first path. For the necessity of this option, we can consider the following cases. The LoS indicator value is the maximum at the N-th detected path. The LoS indicator value is almost same of the N detected path. For example, the $1^{st}$ and the $2^{nd}$ detected path can have LoS indicator value of 0.5

The above options are for a specific DL PRS resource. The LMF may indicate the UE to perform measurement for a specific DL PRS resource set that includes multiple DL PRS resources. In this case, For the CP measurement reporting, the UE prioritizes a DL PRS resource which shows the largest LoS indicator value at the first detected path of all the detected paths from the DL PRS resource. In one embodiment, the UE prioritizes a specific DL PRS resource within the DL PRS resource set such that the line-of-sight indicator value of a first detected path obtained from the DL PRS resource is the largest value among line-of-sight indicators of a first detected path from other DL PRS resources within the DL PRS resource set.

The LMF estimates the UE location based on the provided measurements.

Similar to the DL CP positioning, we also propose the gNB behavior for the UL CP positioning.

UL-Based CP Positioning

The gNB provides the UE with assistance data including SRS configuration information.

For UL (uplink)-based CP positioning, the UE transmits SRS so that multiple TRPs measure the signals in different paths.

When each TRP detects the arrival signal from UE, multiple signals from different paths can be measured. Therefore, TRP could detect a high LoS indication value for a specific arrival path(s) other than the $1^{st}$ detected path of the received signals from a specific SRS resource. For example, the LoS indication value of the $2^{nd}$ detected path is greater than that of the $1^{st}$ detected path. Then, when the gNB sends a report to LMF on the measurement and its LoS indication value, the following options can be used.

Option 1) The gNB reports a UL RSCP measurement for the $1^{st}$ detected path even though LoS probability is lower than the LoS probability of the additional paths such as $2^{nd}$ detected path, but it also informs to the LMF that the $1^{st}$ path LoS indicator is not greater than that of additional paths.

Similar to the DL case, the following example is provided. Reporting contents #1: (LoS indicator=0.4, RTOA measurement, RSCP measurement). Reporting contents #2: (LoS indicator=0.6, RTOA measurement). In addition, the gNB reports the reported measurements associated with LoS indicator of 0.4 is corresponding to the "first path".

Option 2) The gNB reports or is requested by the LMF to report a RSCP or RTOA measurement for a signal path showing the largest LoS indication value. In this option, even if the gNB does not report the LoS indicator, the LMF assumes the set of reporting contents containing RSCP is associated with the largest LoS path.

Option 2-1) The gNB can additionally provide which signal path (n-th detected path, where n>=2) was selected for CP measurement.

Option 2-2) The gNB does not additionally provide any information. The LMF will consider the reported CP measurement for the first path, even though the CP measurement was not made from the first "detected" path.

For example, for option 2-2, the LMF may determine that the carrier phase measurement for the arrival signal path having the largest line of sight indicator value is for the arrival signal path having a line of sight indicator value that is not greater than at least one line of sight indicator for another arrival signal path, in response to the report having the carrier phase difference measurement not comprising the arrival signal path having the largest line of sight indicator value, and the report comprising the carrier phase measurement for the arrival signal path having the largest line of sight indicator value, when the report does not comprise the arrival signal path having the largest line of sight indicator value, and the report comprises the carrier phase measurement for the arrival signal path having the largest line of sight indicator value.

Option 3) The gNB reports an average of RSCP measurements for the first N detected paths (for a number N).

The above options are for a specific UL SRS resource. The LMF may request the gNB to perform measurement for a specific UL PRS resource set SL PRS resources (prior art). The gNB may prioritize specific UL SRS resource(s) which shows the largest LoS indicator value at the first detected path of all the detected paths from the UL SRS resources.

The LMF estimates the UE location based on the provided measurements.

Figure 2:
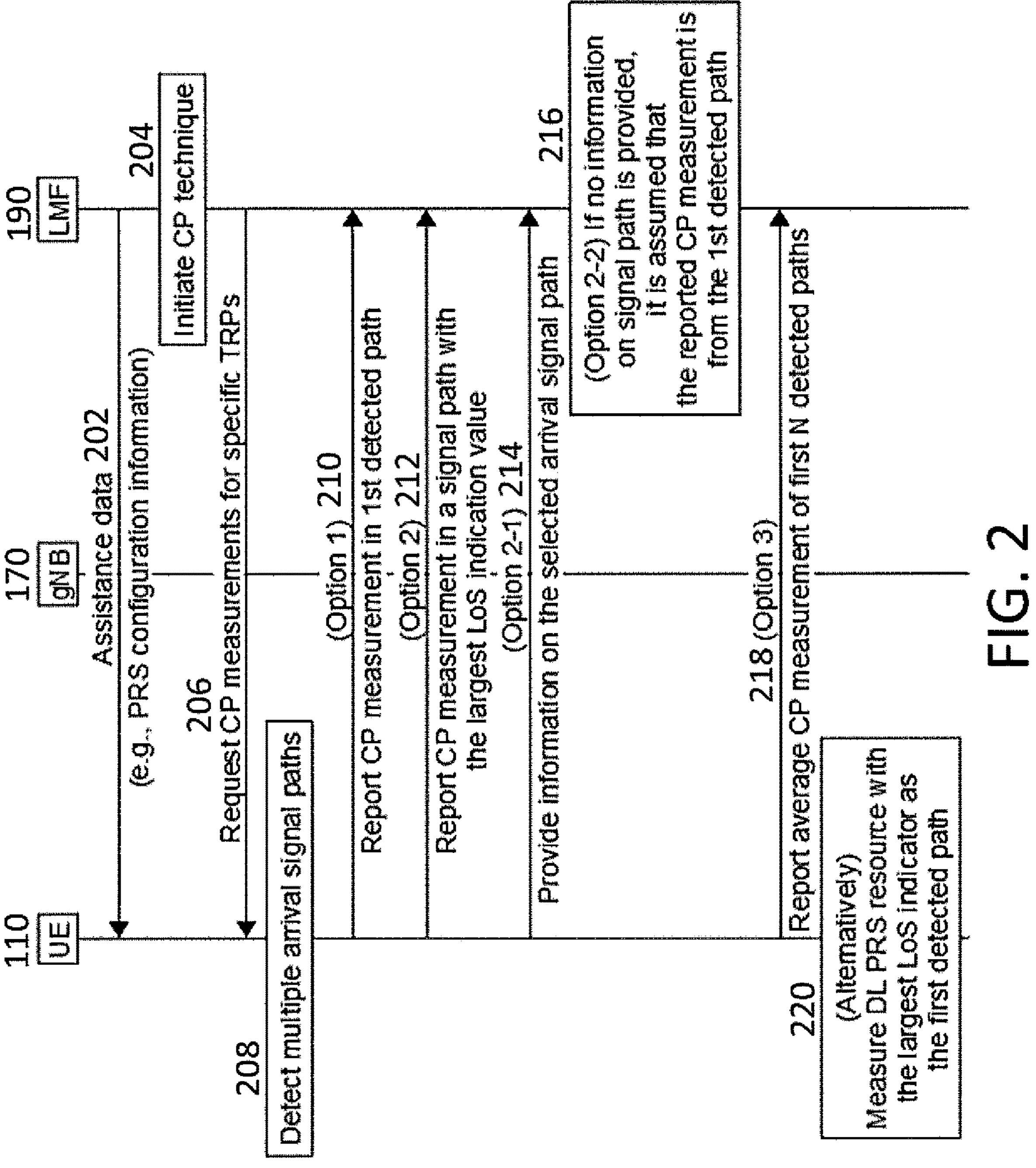
FIG. 2 is a flow chart for DL-based CP positioning.
Figure 3:
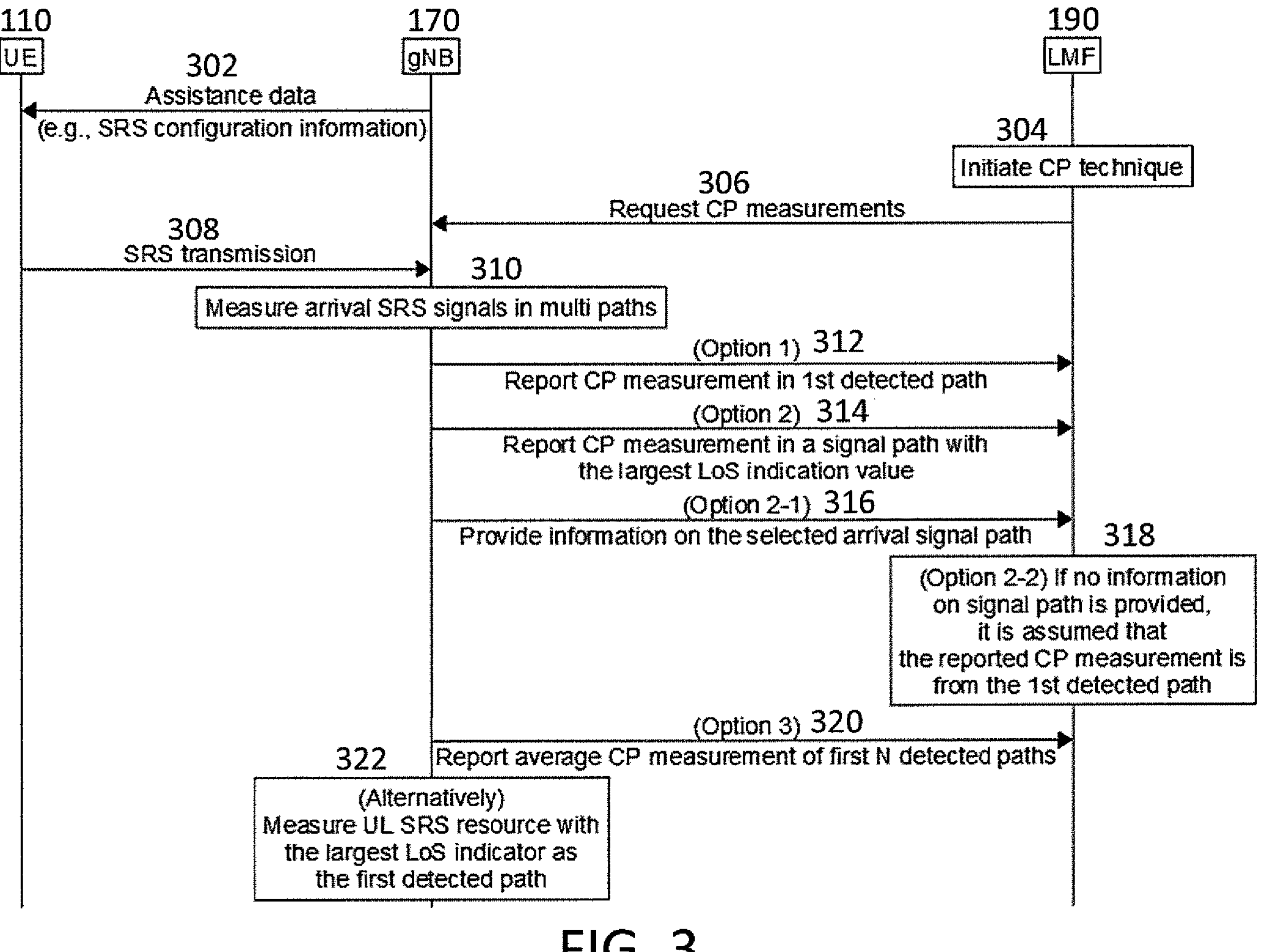
FIG. 3 is a flow chart for UL-based CP positioning.

Additional details and the flow chart of the proposed method both for DL-based CP and UL-based CP techniques are provided in FIG. 2 and FIG. 3.

FIG. 2 is the flow chart for DL-based CP positioning, based on the examples described herein. At 202, the LMF 190 provides assistance data to the UE 110, where the assistance data may include PRS configuration information. At 204, the LMF initiates the CP technique. At 206, the LMF 190 requests from the UE 110 CP measurements for specific TRPs. At 208, the UE detects multiple arrival signal paths from at least one DL PRS.

At 210 (Option 1), the UE 110 reports to the LMF 190 a CP measurement in the first detected path. At 212 (Option 2), the UE 110 reports to the LMF 190 a CP measurement in a signal path with the largest LoS indication value. At 214 (Option 2-1), the UE 110 provides to the LMF 190 information on the selected arrival signal path. At 216 (Option 2-2) performed with the LMF 190, if no information on the signal path is provided, it is assumed that the reported CP measurement is from the first detected path.

At 218 (Option 3), the UE 110 reports to the LMF 190 the average CP measurement of the first N detected paths. At 220 (alternatively), the UE 110 measures the DL PRS resource with the largest LoS indicator as the first detected path.

FIG. 3 is the flow chart for UL-based CP positioning, based on the examples described herein. At 302, the gNB 170 transmits to the UE 110 assistance data, such as SRS configuration information. At 304, the LMF 190 initiates the CP technique. At 306, the LMF 190 requests from the gNB 170 CP measurements. At 308, the UE 110 transmits SRS to the gNB 170. At 310, the gNB 170 measures arrival SRS signals in multiple paths.

At 312 (Option 1) the gNB 170 reports to the LMF 190 a CP measurement in a first detected path. At 314 (Option 2), the gNB 170 reports to the LMF 190 the CP measurement in a signal path with the largest LoS indication value. At 316 (Option 2-1), the gNB 170 provides to the LMF 190 information on the selected arrival signal path. At 318 (Option 2-2), performed with the LMF 190, if no information on the signal path is provided, it is assumed that the reported CP measurement is from the first detected path.

At 320, the gNB 170 reports to the LMF 190 the average CP measurement of the first N detected paths. At 322 (alternatively), the gNB 170 measures the UL SRS resource with the largest LoS indicator as the first detected path.

In some examples, when a first line of sight indicator value for a first arrival signal path of a reference signal has a value that is the same as a value of a second line of sight indicator value for a second arrival signal path of the reference signal, both the first line of sight indicator value and the second line of sight indicator value are considered to be the largest line of sight indicator value.

For Option 1, Option 2, and Option 3, for both DL-based CP positioning and UL-based CP positioning, reported carrier phase measurement may be a reference signal carrier phase difference (RSCPD) measurement. For example, the carrier phase measurement for the arrival signal path having a determined line of sight indicator value that is not greater than at least one of the line of sight indicator values for other detected arrival signal paths may be a reference signal carrier phase difference (RSCPD) measurement. The carrier phase measurement for the arrival signal path that has the largest line of sight indicator value among the determined line of sight indicator values for the detected arrival signal paths may be a reference signal carrier phase difference (RSCPD) measurement. The average carrier phase measurement for at least one arrival signal path of the detected arrival signal paths may be a reference signal carrier phase difference (RSCPD) measurement.

Advantages and technical effects of the examples described herein include accuracy enhancement, and that the examples described herein address the UE ambiguous behavior for the carrier phase measurement reporting.

Figure 4:
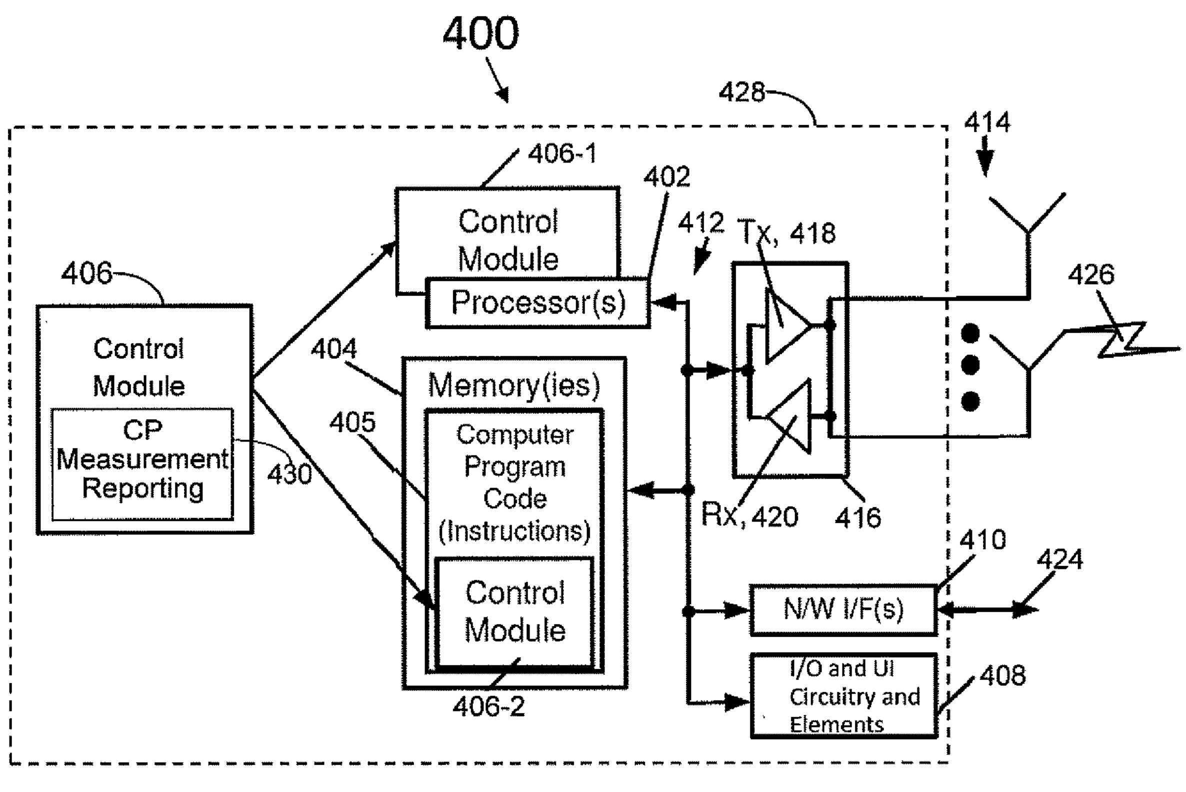
FIG. 4 is an example apparatus configured to implement the examples described herein.

FIG. 4 is an example apparatus 400, which may be implemented in hardware, configured to implement the examples described herein. The apparatus 400 comprises at least one processor 402 (e.g. an FPGA and/or CPU), one or more memories 404 including computer program code 405, the computer program code 405 having instructions to carry out the methods described herein, wherein the at least one memory 404 and the computer program code 405 are configured to, with the at least one processor 402, cause the apparatus 400 to implement circuitry, a process, component, module, or function (implemented with control module 406) to implement the examples described herein. The memory 404 may be a non-transitory memory, a transitory memory, a volatile memory (e.g. RAM), or a non-volatile memory (e.g. ROM).

CP measurement reporting 430 may implement the examples described herein related to a method and reporting of carrier phase measurement reporting.

The apparatus 400 includes a display and/or I/O interface 408, which includes user interface (UI) circuitry and elements, that may be used to display aspects or a status of the methods described herein (e.g., as one of the methods is being performed or at a subsequent time), or to receive input from a user such as with using a keypad, camera, touchscreen, touch area, microphone, biometric recognition, one or more sensors, etc. The apparatus 400 includes one or more communication e.g. network (N/W) interfaces (I/F(s)) 410. The communication I/F(s) 410 may be wired and/or wireless and communicate over the Internet/other network(s) via any communication technique including via one or more links 424. The link(s) 424 may be the link(s) 131 and/or 176 from FIG. 1. The link(s) 131 and/or 176 from FIG. 1 may also be implemented using transceiver(s) 416 and corresponding wireless link(s) 426. The communication I/F(s) 410 may comprise one or more transmitters or one or more receivers.

The transceiver 416 comprises one or more transmitters 418 and one or more receivers 420. The transceiver 416 and/or communication I/F(s) 410 may comprise standard well-known components such as an amplifier, filter, frequency-converter, (de)modulator, and encoder/decoder circuitries and one or more antennas, such as antennas 414 used for communication over wireless link 426.

The control module 406 of the apparatus 400 comprises one of or both parts 406-1 and/or 406-2, which may be implemented in a number of ways. The control module 406 may be implemented in hardware as control module 406-1, such as being implemented as part of the one or more processors 402. The control module 406-1 may be implemented also as an integrated circuit or through other hardware such as a programmable gate array. In another example, the control module 406 may be implemented as control module 406-2, which is implemented as computer program code (having corresponding instructions) 405 and is executed by the one or more processors 402. For instance, the one or more memories 404 store instructions that, when executed by the one or more processors 402, cause the apparatus 400 to perform one or more of the operations as described herein. Furthermore, the one or more processors 402, the one or more memories 404, and example algorithms (e.g., as flowcharts and/or signaling diagrams), encoded as instructions, programs, or code, are means for causing performance of the operations described herein.

The apparatus 400 to implement the functionality of control 406 may be UE 110, RAN node 170 (e.g. gNB), or network element(s) 190 (e.g. LMF 190). Thus, processor 402 may correspond to processor(s) 120, processor(s) 152 and/or processor(s) 175, memory 404 may correspond to one or more memories 125, one or more memories 155 and/or one or more memories 171, computer program code 405 may correspond to computer program code 123, computer program code 153, and/or computer program code 173, control module 406 may correspond to module 140-1, module 140-2, module 150-1, and/or module 150-2, and communication I/F(s) 410 and/or transceiver 416 may correspond to transceiver 130, antenna(s) 128, transceiver 160, antenna(s) 158, N/W I/F(s) 161, and/or N/W I/F(s) 180. Alternatively, apparatus 400 and its elements may not correspond to either of UE 110, RAN node 170, or network element(s) 190 and their respective elements, as apparatus 400 may be part of a self-organizing/optimizing network (SON) node or other node, such as a node in a cloud.

The apparatus 400 may also be distributed throughout the network (e.g. 100) including within and between apparatus 400 and any network element (such as a network control element (NCE) 190 and/or the RAN node 170 and/or UE 110).

Interface 412 enables data communication and signaling between the various items of apparatus 400, as shown in FIG. 4. For example, the interface 412 may be one or more buses such as address, data, or control buses, and may include any interconnection mechanism, such as a series of lines on a motherboard or integrated circuit, fiber optics or other optical communication equipment, and the like. Computer program code (e.g. instructions) 405, including control 406 may comprise object-oriented software configured to pass data or messages between objects within computer program code 405, or computer program code (e.g. instructions) 405, including control 406 may include functional, scripting, or procedural code. The apparatus 400 need not comprise each of the features mentioned, or may comprise other features as well. The various components of apparatus 400 may at least partially reside in a common housing 428, or a subset of the various components of apparatus 400 may at least partially be located in different housings, which different housings may include housing 428.

Figure 5:
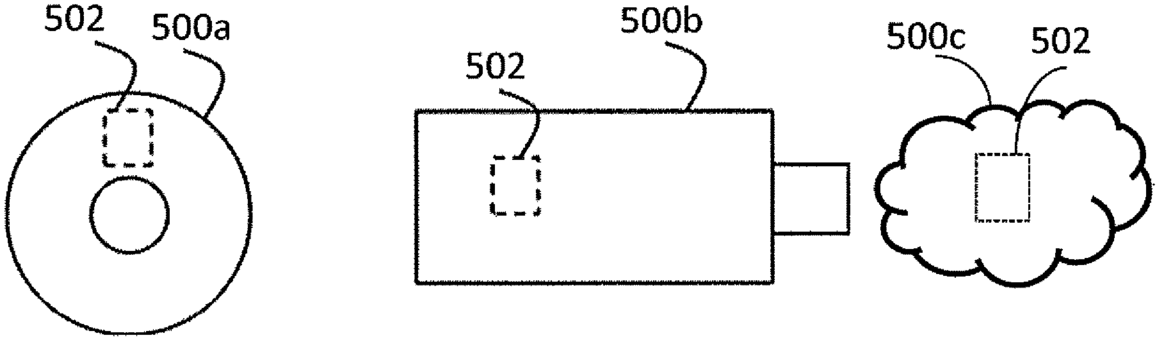
FIG. 5 shows a representation of an example of non-volatile memory media used to store instructions that implement the examples described herein.

FIG. 5 shows a schematic representation of non-volatile memory media 500*a* (e.g. computer/compact disc (CD) or digital versatile disc (DVD)) and 500*b* (e.g. universal serial bus (USB) memory stick) and 500*c* (e.g. cloud storage for downloading instructions and/or parameters 502 or receiving emailed instructions and/or parameters 502) storing instructions and/or parameters 502 which when executed by a processor allows the processor to perform one or more of the steps of the methods described herein. Instructions and/or parameters 502 may represent a non-transitory computer readable medium.

Figure 6:
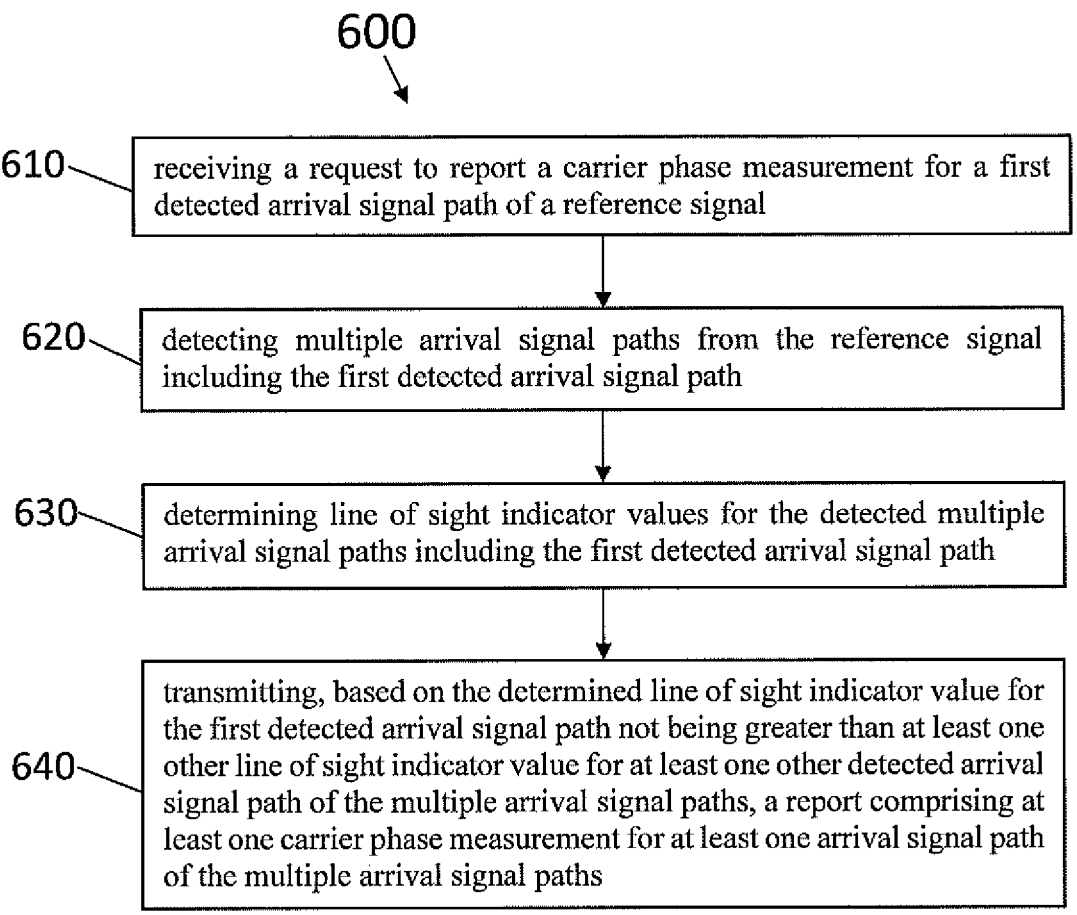
FIG. 6 is an example method, based on the examples described herein.

FIG. 6 is an example method 600 based on the examples described herein. At 610, the method includes receiving a request to report a carrier phase measurement for a first detected arrival signal path of a reference signal. At 620, the method includes detecting multiple arrival signal paths from the reference signal including the first detected arrival signal path. At 630, the method includes determining line of sight indicator values for the detected multiple arrival signal paths including the first detected arrival signal path. At 640, the method includes transmitting, based on the determined line of sight indicator value for the first detected arrival signal path not being greater than at least one other line of sight indicator value for at least one other detected arrival signal path of the multiple arrival signal paths, a report comprising at least one carrier phase measurement for at least one arrival signal path of the multiple arrival signal paths. Method 600 may be performed with UE 110, RAN node 170 (e.g. gNB 170), or apparatus 400.

Figure 7:
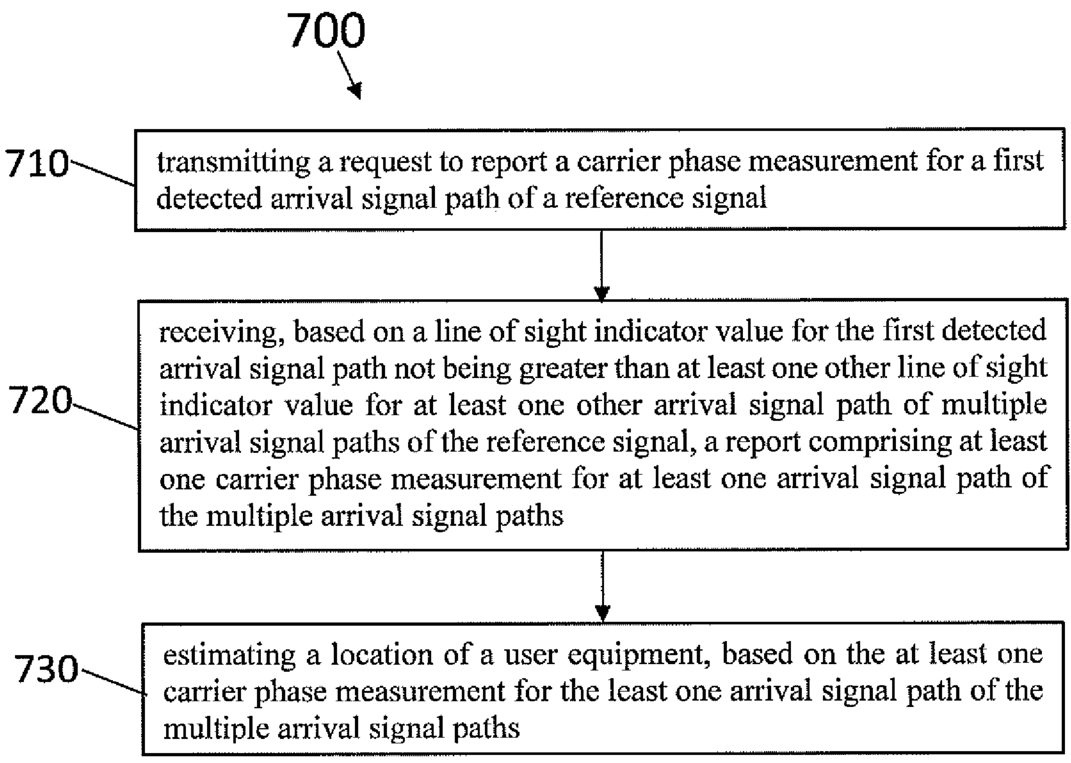
FIG. 7 is an example method, based on the examples described herein.

FIG. 7 is an example method 700 based on the examples described herein. At 710, the method includes transmitting a request to report a carrier phase measurement for a first detected arrival signal path of a reference signal. At 720, the method includes receiving, based on a line of sight indicator value for the first detected arrival signal path not being greater than at least one other line of sight indicator value for at least one other arrival signal path of multiple arrival signal paths of the reference signal, a report comprising at least one carrier phase measurement for at least one arrival signal path of the multiple arrival signal paths. At 730, the method includes estimating a location of a user equipment, based on the at least one carrier phase measurement for the least one arrival signal path of the multiple arrival signal paths. Method 700 may be performed with one or more network elements 190 (e.g. LMF 190), or apparatus 400.

Figure 8:
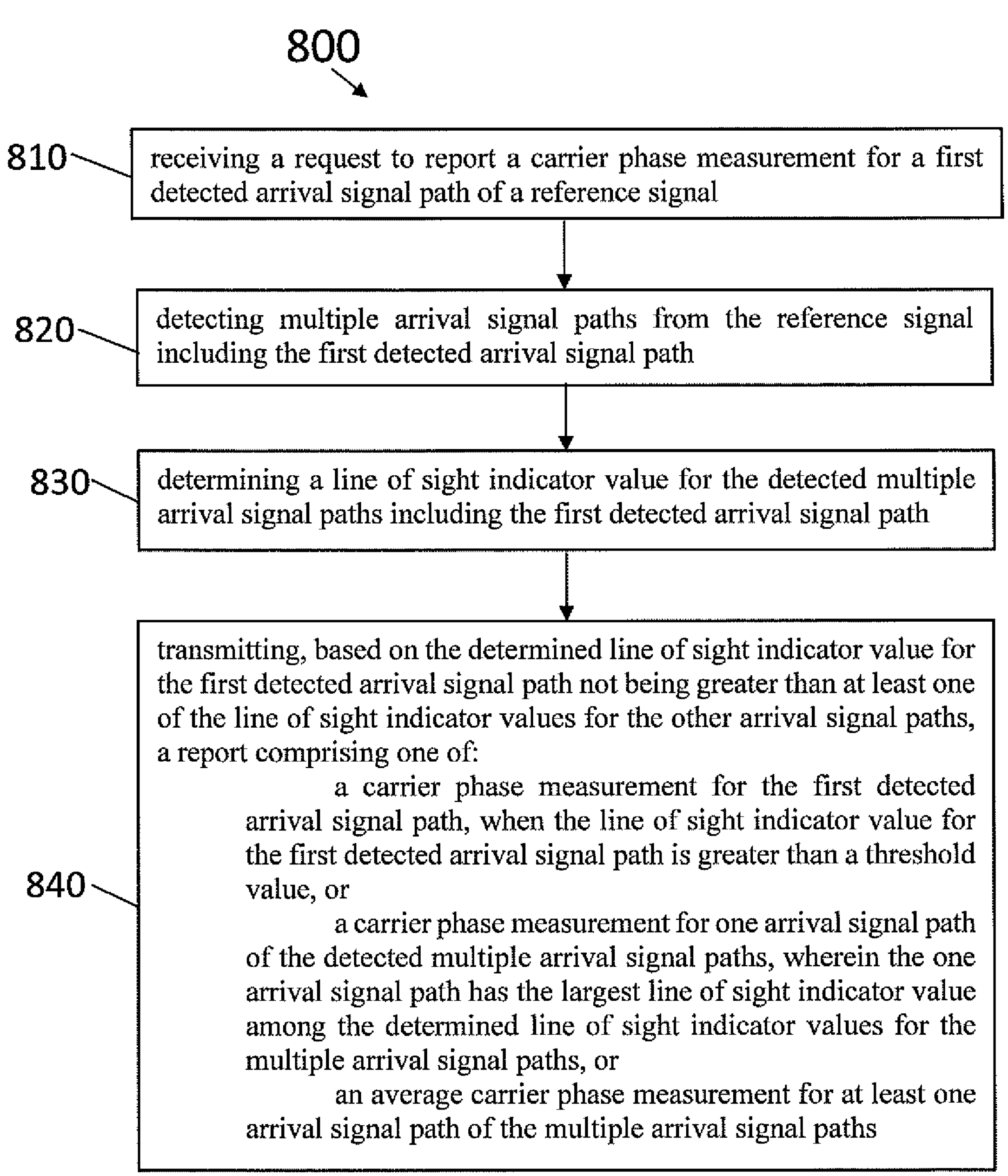
FIG. 8 is an example method, based on the examples described herein.

FIG. 8 is an example method 800 based on the examples described herein. At 810, the method includes receiving a request to report a carrier phase measurement for a first detected arrival signal path of a reference signal. At 820, the method includes detecting multiple arrival signal paths from the reference signal including the first detected arrival signal path. At 830, the method includes determining a line of sight indicator value for the detected multiple arrival signal paths including the first detected arrival signal path. At 840, the method includes transmitting, based on the determined line of sight indicator value for the first detected arrival signal path not being greater than at least one of the line of sight indicator values for the other arrival signal paths, a report comprising one of: a carrier phase measurement for the first detected arrival signal path, when the line of sight indicator value for the first detected arrival signal path is greater than a threshold value, or a carrier phase measurement for one arrival signal path of the detected multiple arrival signal paths, wherein the one arrival signal path has the largest line of sight indicator value among the determined line of sight indicator values for the multiple arrival signal paths, or an average carrier phase measurement for at least one arrival signal path of the multiple arrival signal paths. Method 800 may be performed with UE 110, RAN node 170 (e.g. gNB 170), or apparatus 400.

The following examples are provided and described herein.

Example 1. An apparatus including: at least one processor; and at least one non-transitory memory storing instructions that, when executed by the at least one processor, cause the apparatus at least to: receive a request to report a carrier phase measurement for a first detected arrival signal path of a reference signal; detect multiple arrival signal paths from the reference signal including the first detected arrival signal path; determine line of sight indicator values for the detected multiple arrival signal paths including the first detected arrival signal path; and transmit, based on the determined line of sight indicator value for the first detected arrival signal path not being greater than at least one other line of sight indicator value for at least one other detected arrival signal path of the multiple arrival signal paths, a report comprising at least one carrier phase measurement for at least one arrival signal path of the multiple arrival signal paths.

Example 2. The apparatus of example 1, wherein the instructions, when executed by the at least one processor, cause the apparatus at least to: transmit, to a network entity, an indication that the line of sight indicator value for the first detected arrival signal path is not greater than the at least one other line of sight indicator value for the at least one other detected arrival signal path of the multiple arrival signal paths.

Example 3. The apparatus of any of examples 1 to 2, wherein the instructions, when executed by the at least one processor, cause the apparatus at least to: determine that the line of sight indicator value for the first detected arrival signal path is greater than a threshold value; determine a carrier phase measurement for the first detected arrival signal path; and determine to include, within the report, the carrier phase measurement for the first detected arrival signal path, in response to the determining that the line of sight indicator value for the first detected arrival signal path is greater than the threshold value.

Example 4. The apparatus of any of examples 1 to 3, wherein the instructions, when executed by the at least one processor, cause the apparatus at least to: determine a carrier phase measurement for one arrival signal path of the detected multiple arrival signal paths, wherein the one arrival signal path has the largest line of sight indicator value among the determined line of sight indicator values for the multiple arrival signal paths; and determine to include, within the report, the carrier phase measurement for the one arrival signal path having the largest line of sight indicator value among the determined line of sight indicator values for the multiple arrival signal paths.

Example 5. The apparatus of example 4, wherein the instructions, when executed by the at least one processor, cause the apparatus at least to: determine to include, within the report, an indication of the one arrival signal path having the largest line of sight indicator value.

Example 6. The apparatus of any of examples 1 to 5, wherein the instructions, when executed by the at least one processor, cause the apparatus at least to: determine an average carrier phase measurement for one or more arrival signal paths of the multiple arrival signal paths; and determine to include, within the report, the average carrier phase measurement for the one or more arrival signal paths of the multiple arrival signal paths.

Example 7. The apparatus of example 6, wherein the instructions, when executed by the at least one processor, cause the apparatus at least to: determine a set of the multiple arrival signal paths, wherein the line of sight indicator values for arrival signal paths within the set are the same, or differences between the line of sight indicator values for arrival signal paths within the set are less than a threshold value; wherein determining the average carrier phase measurement for the one or more arrival signal paths of the multiple arrival signal paths comprises determining an average carrier phase measurement for the arrival signal paths within the set of the multiple arrival signal paths.

Example 8. The apparatus of any of examples 6 to 7, wherein the instructions, when executed by the at least one processor, cause the apparatus at least to: determine one arrival signal path that has the largest line of sight indicator value among the determined line of sight indicator values for the multiple arrival signal paths; and wherein determining the average carrier phase measurement for the one or more arrival signal paths of the multiple arrival signal paths comprises determining an average carrier phase measurement for the one arrival signal path that has the largest line of sight indicator value among the determined line of sight indicator values for the multiple arrival signal paths.

Example 9. The apparatus of any of examples 1 to 8, wherein the at least one carrier phase measurement for the at least one arrival signal path of the multiple arrival signal paths comprises a reference signal carrier phase measurement.

Example 10. The apparatus of any of examples 1 to 9, wherein the instructions, when executed by the at least one processor, cause the apparatus at least to: prioritize, for carrier phase measurement reporting, a downlink positioning reference signal resource associated with the largest line of sight indicator value among the determined line of sight indicator values for the multiple arrival signal paths.

Example 11. The apparatus of any of examples 1 to 10, wherein the instructions, when executed by the at least one processor, cause the apparatus at least to: prioritize, for carrier phase measurement reporting, an uplink sounding reference signal resource associated with the largest line of sight indicator value among the determined line of sight indicator values for the multiple arrival signal paths.

Example 12. The apparatus of any of examples 1 to 11, wherein: the first detected arrival signal path of the multiple arrival signal paths is detected by the apparatus at a first time, and other arrival signal paths of the multiple arrival signal paths other than the first detected arrival signal path are detected by the apparatus at times later than the first time; and the line of sight indicator value for the first detected arrival signal path is not greater than at least one of the line of sight indicator values for the other arrival signal paths. The first detected arrival signal path may be associated with a first noise signal, a first interference signal, or a first received signal power, and another arrival signal path of the multiple arrival signal paths different from the first detected arrival signal path may not comprise a noise signal or an interference signal, or may be associated with a second noise signal that is less strong than the first noise signal, a second interference signal that is less strong than the first interference signal, or a second received signal power that is greater than the first received signal power, wherein the another arrival signal path is detected with the apparatus at another time later than the first time.

Example 13. The apparatus of any of examples 1 to 12, wherein: the reference signal comprises a positioning reference signal; and the apparatus comprises a user equipment, or the user equipment comprises the apparatus.

Example 14. The apparatus of any of examples 1 to 13, wherein: the reference signal comprises a sounding reference signal; and the apparatus comprises a transmission reception point, or the transmission reception point comprises the apparatus.

Example 15. The apparatus of any of examples 1 to 14, wherein: the request to report the carrier phase measurement for the first detected arrival signal path of the reference signal is received from a network entity; and the report comprising the at least one carrier phase measurement for the at least one arrival signal path is transmitted to the network entity; wherein the network entity comprises a location management function.

Example 16. An apparatus including: at least one processor; and at least one non-transitory memory storing instructions that, when executed by the at least one processor, cause the apparatus at least to: transmit a request to report a carrier phase measurement for a first detected arrival signal path of a reference signal; receive, based on a line of sight indicator value for the first detected arrival signal path not being greater than at least one other line of sight indicator value for at least one other arrival signal path of multiple arrival signal paths of the reference signal, a report comprising at least one carrier phase measurement for at least one arrival signal path of the multiple arrival signal paths; and estimate a location of a user equipment, based on the at least one carrier phase measurement for the least one arrival signal path of the multiple arrival signal paths.

Example 17. The apparatus of example 16, wherein the instructions, when executed by the at least one processor, cause the apparatus at least to: receive, from the user equipment or a transmission reception point, an indication that the line of sight indicator value for the first detected arrival signal path is not greater than the at least one other line of sight indicator value for the at least one other arrival signal path of the multiple arrival signal paths.

Example 18. The apparatus of any of examples 16 to 17, wherein the at least one carrier phase measurement received within the report comprises a carrier phase measurement for the first detected arrival signal path, when the line of sight indicator value for the first detected arrival signal path is greater than a threshold value.

Example 19. The apparatus of any of examples 16 to 18, wherein the at least one carrier phase measurement received within the report comprises a carrier phase measurement for one arrival signal path having the largest line of sight indicator value among line of sight indicator values for the multiple arrival signal paths.

Example 20. The apparatus of example 19, wherein the report comprises an indication of the one arrival signal path having the largest line of sight indicator value.

Example 21. The apparatus of any of examples 16 to 20, wherein the report comprises an average carrier phase measurement for one or more arrival signal paths of the multiple arrival signal paths.

Example 22. The apparatus of example 21, wherein: the average carrier phase measurement for the one or more arrival signal paths of the multiple arrival signal paths within the report comprises an average carrier phase measurement for arrival signal paths within a set of the multiple arrival signal paths; and line of sight indicator values for the arrival signal paths within the set are the same, or differences between line of sight indicator values for the arrival signal paths within the set are less than a threshold value. The threshold value can be configured by the LMF or predefined as a fixed value.

Example 23. The apparatus of any of examples 21 to 22, wherein the average carrier phase measurement for the one or more arrival signal paths of the multiple arrival signal paths within the report comprises an average carrier phase measurement for one arrival signal path having the largest line of sight indicator value among line of sight indicator values for the multiple arrival signal paths.

Example 24. The apparatus of any of examples 16 to 23, wherein the at least one carrier phase measurement for the at least one arrival signal path of the multiple arrival signal paths comprises a reference signal carrier phase measurement.

Example 25. The apparatus of any of examples 16 to 24, wherein the instructions, when executed by the at least one processor, cause the apparatus at least to: transmit, to the user equipment, an indication to prioritize, for carrier phase measurement reporting, a downlink positioning reference signal resource associated with the largest line of sight indicator value among line of sight indicator values for the multiple arrival signal paths.

Example 26. The apparatus of any of examples 16 to 25, wherein the instructions, when executed by the at least one processor, cause the apparatus at least to: transmit, to a transmission reception point, an indication to prioritize, for carrier phase measurement reporting, an uplink sounding reference signal resource associated with the largest line of sight indicator value among line of sight indicator values for the multiple arrival signal paths.

Example 27. The apparatus of any of examples 16 to 26, wherein: the first detected arrival signal path of the multiple arrival signal paths is associated with a first time, and other arrival signal paths of the multiple arrival signal paths other than the first detected arrival signal path are associated with times later than the first time; and the line of sight indicator value for the first detected arrival signal path is not greater than at least one of the line of sight indicator values for the other arrival signal paths. The first detected arrival signal path may be associated with a first noise signal, a first interference signal, or a first received signal power, and another arrival signal path of the multiple arrival signal paths different from the first detected arrival signal path may not comprise a noise signal or an interference signal, or may be associated with a second noise signal that is less strong than the first noise signal, a second interference signal that is less strong than the first interference signal, or a second received signal power that is greater than the first received signal power, wherein the another arrival signal path is detected at another time later than the first time.

Example 28. The apparatus of any of examples 16 to 27, wherein: the reference signal comprises a positioning reference signal; the request to report the carrier phase measurement for the first detected arrival signal path of the reference signal is transmitted to the user equipment; and the report comprising the at least one carrier phase measurement for the at least one arrival signal path is received from the user equipment.

Example 29. The apparatus of any of examples 16 to 28, wherein: the reference signal comprises a sounding reference signal; the request to report the carrier phase measurement for the first detected arrival signal path of the reference signal is transmitted to a transmission reception point; and the report comprising the at least one carrier phase measurement for the at least one arrival signal path is received from the transmission reception point.

Example 30. The apparatus of any of examples 16 to 29, wherein the apparatus comprises a location management function.

Example 31. An apparatus including: at least one processor; and at least one non-transitory memory storing instructions that, when executed by the at least one processor, cause the apparatus at least to: receive a request to report a carrier phase measurement for a first detected arrival signal path of a reference signal; detect multiple arrival signal paths from the reference signal including the first detected arrival signal path; determine a line of sight indicator value for the detected multiple arrival signal paths including the first detected arrival signal path; and transmit, based on the determined line of sight indicator value for the first detected arrival signal path not being greater than at least one of the line of sight indicator values for the other arrival signal paths, a report comprising one of: a carrier phase measurement for the first detected arrival signal path, when the line of sight indicator value for the first detected arrival signal path is greater than a threshold value, or a carrier phase measurement for one arrival signal path of the detected multiple arrival signal paths, wherein the one arrival signal path has the largest line of sight indicator value among the determined line of sight indicator values for the multiple arrival signal paths, or an average carrier phase measurement for at least one arrival signal path of the multiple arrival signal paths.

Example 32. A method including: receiving a request to report a carrier phase measurement for a first detected arrival signal path of a reference signal; detecting multiple arrival signal paths from the reference signal including the first detected arrival signal path; determining line of sight indicator values for the detected multiple arrival signal paths including the first detected arrival signal path; and transmitting, based on the determined line of sight indicator value for the first detected arrival signal path not being greater than at least one other line of sight indicator value for at least one other detected arrival signal path of the multiple arrival signal paths, a report comprising at least one carrier phase measurement for at least one arrival signal path of the multiple arrival signal paths.

Example 33. A method including: transmitting a request to report a carrier phase measurement for a first detected arrival signal path of a reference signal; receiving, based on a line of sight indicator value for the first detected arrival signal path not being greater than at least one other line of sight indicator value for at least one other arrival signal path of multiple arrival signal paths of the reference signal, a report comprising at least one carrier phase measurement for at least one arrival signal path of the multiple arrival signal paths; and estimating a location of a user equipment, based on the at least one carrier phase measurement for the least one arrival signal path of the multiple arrival signal paths.

Example 34. A method including: receiving a request to report a carrier phase measurement for a first detected arrival signal path of a reference signal; detecting multiple arrival signal paths from the reference signal including the first detected arrival signal path; determining a line of sight indicator value for the detected multiple arrival signal paths including the first detected arrival signal path; and transmitting, based on the determined line of sight indicator value for the first detected arrival signal path not being greater than at least one of the line of sight indicator values for the other arrival signal paths, a report comprising one of: a carrier phase measurement for the first detected arrival signal path, when the line of sight indicator value for the first detected arrival signal path is greater than a threshold value, or a carrier phase measurement for one arrival signal path of the detected multiple arrival signal paths, wherein the one arrival signal path has the largest line of sight indicator value among the determined line of sight indicator values for the multiple arrival signal paths, or an average carrier phase measurement for at least one arrival signal path of the multiple arrival signal paths.

Example 35. An apparatus including: means for receiving a request to report a carrier phase measurement for a first detected arrival signal path of a reference signal; means for detecting multiple arrival signal paths from the reference signal including the first detected arrival signal path; means for determining line of sight indicator values for the detected multiple arrival signal paths including the first detected arrival signal path; and means for transmitting, based on the determined line of sight indicator value for the first detected arrival signal path not being greater than at least one other line of sight indicator value for at least one other detected arrival signal path of the multiple arrival signal paths, a report comprising at least one carrier phase measurement for at least one arrival signal path of the multiple arrival signal paths.

Example 36. An apparatus including: means for transmitting a request to report a carrier phase measurement for a first detected arrival signal path of a reference signal; means for receiving, based on a line of sight indicator value for the first detected arrival signal path not being greater than at least one other line of sight indicator value for at least one other arrival signal path of multiple arrival signal paths of the reference signal, a report comprising at least one carrier phase measurement for at least one arrival signal path of the multiple arrival signal paths; and means for estimating a location of a user equipment, based on the at least one carrier phase measurement for the least one arrival signal path of the multiple arrival signal paths.

Example 37. An apparatus including: means for receiving a request to report a carrier phase measurement for a first detected arrival signal path of a reference signal; means for detecting multiple arrival signal paths from the reference signal including the first detected arrival signal path; means for determining a line of sight indicator value for the detected multiple arrival signal paths including the first detected arrival signal path; and means for transmitting, based on the determined line of sight indicator value for the first detected arrival signal path not being greater than at least one of the line of sight indicator values for the other arrival signal paths, a report comprising one of: a carrier phase measurement for the first detected arrival signal path, when the line of sight indicator value for the first detected arrival signal path is greater than a threshold value, or a carrier phase measurement for one arrival signal path of the detected multiple arrival signal paths, wherein the one arrival signal path has the largest line of sight indicator value among the determined line of sight indicator values for the multiple arrival signal paths, or an average carrier phase measurement for at least one arrival signal path of the multiple arrival signal paths.

Example 38. A computer readable medium including instructions stored thereon for performing at least the following: receiving a request to report a carrier phase measurement for a first detected arrival signal path of a reference signal; detecting multiple arrival signal paths from the reference signal including the first detected arrival signal path; determining line of sight indicator values for the detected multiple arrival signal paths including the first detected arrival signal path; and transmitting, based on the determined line of sight indicator value for the first detected arrival signal path not being greater than at least one other line of sight indicator value for at least one other detected arrival signal path of the multiple arrival signal paths, a report comprising at least one carrier phase measurement for at least one arrival signal path of the multiple arrival signal paths.

Example 39. A computer readable medium including instructions stored thereon for performing at least the following: transmitting a request to report a carrier phase measurement for a first detected arrival signal path of a reference signal; receiving, based on a line of sight indicator value for the first detected arrival signal path not being greater than at least one other line of sight indicator value for at least one other arrival signal path of multiple arrival signal paths of the reference signal, a report comprising at least one carrier phase measurement for at least one arrival signal path of the multiple arrival signal paths; and estimating a location of a user equipment, based on the at least one carrier phase measurement for the least one arrival signal path of the multiple arrival signal paths.

Example 40. A computer readable medium including instructions stored thereon for performing at least the following: receiving a request to report a carrier phase measurement for a first detected arrival signal path of a reference signal; detecting multiple arrival signal paths from the reference signal including the first detected arrival signal path; determining a line of sight indicator value for the detected multiple arrival signal paths including the first detected arrival signal path;

and transmitting, based on the determined line of sight indicator value for the first detected arrival signal path not being greater than at least one of the line of sight indicator values for the other arrival signal paths, a report comprising one of: a carrier phase measurement for the first detected arrival signal path, when the line of sight indicator value for the first detected arrival signal path is greater than a threshold value, or a carrier phase measurement for one arrival signal path of the detected multiple arrival signal paths, wherein the one arrival signal path has the largest line of sight indicator value among the determined line of sight indicator values for the multiple arrival signal paths, or an average carrier phase measurement for at least one arrival signal path of the multiple arrival signal paths. The carrier phase measurement includes an RSCP (Reference Signal Carrier Phase) measurement and an RSCPD (Reference Signal Carrier Phase Difference) measurement. The RSCPD is a difference of two different RSCP measurements, where the RSCP measurements could be measured from a single or two different TRPs. In addition, the carrier phase measurement includes a difference value of two different RSCPD measurements, which may be also called (for example referred to as) a double differential measurement.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memories as described herein may be implemented using any suitable data storage technology, such as semiconductor based memory devices, flash memory, magnetic memory devices and systems, optical memory devices and systems, non-transitory memory, transitory memory, fixed memory and removable memory. The memories may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memories that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

It should be understood that the foregoing description is only illustrative. Various alternatives and modifications may be devised by those skilled in the art. For example, features recited in the various dependent claims could be combined with each other in any suitable combination(s). In addition, features from different example embodiments described above could be selectively combined into a new example embodiment. Accordingly, this description is intended to embrace all such alternatives, modifications and variances which fall within the scope of the appended claims.

The following acronyms and abbreviations that may be found in the specification and/or the drawing figures are given as follows (the abbreviations and acronyms may be appended/combined with each other or with other characters using e.g. a dash, hyphen, slash, letter, or number, and may be case insensitive):

3GPP third generation partnership project
4G fourth generation
5G fifth generation
5GC 5G core network
6G sixth generation
AMF access and mobility management function
ASIC application-specific integrated circuit
CD compact/computer disc
CP carrier phase
CPU central processing unit
CU central unit or centralized unit
DL downlink
DSP digital signal processor
DU distributed unit
DVD digital versatile disc
eNB evolved Node B (e.g., an LTE base station)
EN-DC E-UTRAN new radio-dual connectivity
en-gNB node providing NR user plane and control plane protocol terminations towards the UE, and acting as a secondary node in EN-DC
E-UTRA evolved UMTS terrestrial radio access, i.e., the LTE radio access technology
E-UTRAN E-UTRA network
F1 interface between the CU and the DU
FPGA field-programmable gate array
gNB base station for 5G/NR, i.e., a node providing NR user plane and control plane protocol terminations towards the UE, and connected via the NG interface to the 5GC
IAB integrated access and backhaul
I/F interface
I/O input/output
LMF location management function
LoS line of sight
LTE long term evolution (4G)
MAC medium access control
MME mobility management entity
MRO mobility robustness optimization
N indication of a number for variable number N
NCE network control element
ng or NG new generation
ng-eNB new generation eNB
NG-RAN new generation radio access network
NLoS non line of sight
NR new radio
N/W network
PDA personal digital assistant
PDCP packet data convergence protocol
PFL positioning frequency layer
PHY physical layer
PRS positioning reference signal
PRU positioning reference unit
RAM random access memory RAN radio access network
RAT radio access technology
Rel release
RLC radio link control
ROM read-only memory
RP RAN plenary
RRC radio resource control
RRM radio resource management
RSCP reference signal carrier phase
RSCPD reference signal carrier phase difference
RSTD reference signal time difference
RTOA relative time of arrival
RU radio unit
Rx, RX receive, or receiver, or reception
SDAP service data adaptation protocol
SGW serving gateway
SMF session management function
SON self-organizing/optimizing network
SRS sounding reference signal
TDOA time difference of arrival
TRP transmission reception point
TS technical specification
Tx, TX transmit, or transmitter, or transmission
UAV unmanned aerial vehicle
UE user equipment (e.g., a wireless, typically mobile device)
UI user interface
UL uplink
UMTS Universal Mobile Telecommunications System
UPF user plane function
USB universal serial bus
UTRAN UMTS terrestrial radio access network
WID work item description
X2 network interface between RAN nodes and between RAN and the core network
Xn network interface between NG-RAN nodes

What is claimed is:

1. An apparatus comprising:
at least one processor; and
at least one non-transitory memory storing instructions that, when executed by the at least one processor, cause the apparatus at least to:
receive a request to report a carrier phase measurement for a first detected arrival signal path of a reference signal;
detect multiple arrival signal paths from the reference signal including the first detected arrival signal path;
determine line of sight indicator values for the detected multiple arrival signal paths including the first detected arrival signal path;
transmit, based on the determined line of sight indicator value for the first detected arrival signal path not being greater than at least one other line of sight indicator value for at least one other detected arrival signal path of the multiple arrival signal paths, a report comprising at least one carrier phase measurement for at least one arrival signal path of the multiple arrival signal paths;
transmit, to a network entity, an indication that the line of sight indicator value for the first detected arrival signal path is not greater than the at least one other line of sight indicator value for the at least one other detected arrival signal path of the multiple arrival signal paths;
determine that the line of sight indicator value for the first detected arrival signal path is greater than a threshold value;
determine the carrier phase measurement for the first detected arrival signal path;
determine to include, within the report, the carrier phase measurement for the first detected arrival signal path, in response to the determining that the line of sight indicator value for the first detected arrival signal path is greater than the threshold value;
determine to include, within the report, the carrier phase measurement for the first detected arrival signal path, in response to the determining that the line of sight indicator value for the first detected arrival signal path is greater than the threshold value;
determine to include, within the report, the carrier phase measurement for the one arrival signal path having the largest line of sight indicator value among the determined line of sight indicator values for the multiple arrival signal paths;
determine to include, within the report, an indication of the one arrival signal path having the largest line of sight indicator value;
determine a carrier phase measurement for one arrival signal path of the detected multiple arrival signal paths, wherein the one arrival signal path has the largest line of sight indicator value among the determined line of sight indicator values for the multiple arrival signal paths;
report, to the network entity, a carrier phase measurement for a signal path having a largest line-of-sight indication value among the multiple arrival signal paths;
determine an average carrier phase measurement for one or more arrival signal paths of the multiple arrival signal paths;
determine to include, within the report, the average carrier phase measurement for the one or more arrival signal paths of the multiple arrival signal paths;
determine a set of the multiple arrival signal paths, wherein the line of sight indicator values for arrival signal paths within the set are the same, or differences between the line of sight indicator values for arrival signal paths within the set are less than a threshold value;
determine one arrival signal path that has the largest line of sight indicator value among the determined line of sight indicator values for the multiple arrival signal paths;
prioritize, for carrier phase measurement reporting, a downlink positioning reference signal resource associated with the largest line of sight indicator value among the determined line of sight indicator values for the multiple arrival signal paths;
prioritize, for carrier phase measurement reporting, an uplink sounding reference signal resource associated with the largest line of sight indicator value among the determined line of sight indicator values for the multiple arrival signal paths; and
receive assistance data comprising positioning reference signal configuration information,
wherein determining the average carrier phase measurement for the one or more arrival signal paths of the multiple arrival signal paths comprises determining an average carrier phase measurement for the arrival signal paths within the set of the multiple arrival signal paths,
wherein determining the average carrier phase measurement for the one or more arrival signal paths of the multiple arrival signal paths comprises determining an average carrier phase measurement for the one arrival signal path that has the largest line of sight indicator value among the determined line of sight indicator values for the multiple arrival signal paths, wherein the at least one carrier phase measurement for the at least one arrival signal path of the multiple arrival signal paths comprises a reference signal carrier phase measurement, wherein the first detected arrival signal path of the multiple arrival signal paths is detected by the apparatus at a first time, and other arrival signal paths of the multiple arrival signal paths other than the first detected arrival signal path are detected by the apparatus at times later than the first time, wherein the line of sight indicator value for the first detected arrival signal path is not greater than at least one of the line of sight indicator values for the other arrival signal paths, wherein the reference signal comprises a positioning reference signal, wherein the apparatus comprises a user equipment, or the user equipment comprises the apparatus, wherein the reference signal comprises a sounding reference signal, wherein the apparatus comprises a transmission reception point, or the transmission reception point comprises the apparatus, wherein the request to report the carrier phase measurement for the first detected arrival signal path of the reference signal is received from a network entity, wherein the report comprising the at least one carrier phase measurement for the at least one arrival signal path is transmitted to the network entity, wherein the network entity comprises a location management function, wherein the first detected arrival signal path is a first detected path in time, wherein the multiple arrival signal paths are detected from a specific reference signal resource, wherein the report indicates that the reported carrier phase measurement is associated with the first detected arrival signal path, wherein the indication of the one arrival signal path identifies an N-th detected path selected for obtaining the carrier phase measurement, wherein, when the report does not include information identifying the one arrival signal path, the report is interpretable by the network entity as corresponding to the first detected arrival signal path, wherein determining the average carrier phase measurement comprises determining an average of carrier phase measurements for the first N detected arrival signal paths, wherein the request indicates that measurement is to be performed for a downlink positioning reference signal resource set including multiple downlink positioning reference signal resources, and wherein the apparatus prioritizes, for carrier phase measurement reporting, a specific downlink positioning reference signal resource within the resource set whose first detected path has the largest line-of-sight indicator value among first detected paths from the downlink positioning reference signal resources within the resource set, and wherein measurement is performed for a specific uplink sounding reference signal resource set including multiple uplink sounding reference signal resources, and wherein the apparatus prioritizes an uplink sounding reference signal resource whose first detected path has the largest line-of-sight indicator value among first detected paths from the uplink sounding reference signal resources.

* * * * *